(12) United States Patent
Kwok et al.

(10) Patent No.: US 7,597,288 B2
(45) Date of Patent: Oct. 6, 2009

(54) IN-FLIGHT REFUELING LIGHTNING PROTECTION SYSTEM

(75) Inventors: David W. Kwok, La Mirada, CA (US); David M. Smith, Santa Ana, CA (US); John W. Smith, Buena Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/418,856

(22) Filed: May 5, 2006

(65) Prior Publication Data

US 2007/0257154 A1 Nov. 8, 2007

(51) Int. Cl.
*B64D 39/04* (2006.01)
*B64D 39/06* (2006.01)

(52) U.S. Cl. .............. 244/135 A; 244/135 R; 244/136; 261/75

(58) Field of Classification Search ............ 244/135 R, 244/135 A, 135 B, 135 C; 141/285, 82, 387; 261/18.3, 22, 76, DIG. 75; 239/398, 417.5, 239/418, 419, 423; 285/123.15, 123.16, 285/123.1, 14, 924
See application file for complete search history.

(56) References Cited

U.S. PATENT DOCUMENTS

| | | | | |
|---|---|---|---|---|
| 2,248,308 | A * | 7/1941 | Rice .................... | 244/135 R |
| 2,634,927 | A | 4/1953 | Smith et al. | |
| 2,761,701 | A | 9/1956 | Morse et al. | |
| 3,229,446 | A | 1/1966 | Sebastian et al. | |
| 3,732,668 | A | 5/1973 | Nichols | |
| 4,378,920 | A * | 4/1983 | Runnels et al. ......... | 244/135 R |
| 5,326,052 | A * | 7/1994 | Krispin et al. .......... | 244/135 A |
| 5,499,784 | A * | 3/1996 | Crabere et al. .......... | 244/135 A |
| 6,182,714 | B1 * | 2/2001 | Ginsburgh et al. ............ | 141/63 |
| 6,263,924 | B1 * | 7/2001 | Grosser ...................... | 141/102 |
| 6,293,525 | B1 * | 9/2001 | Ginsburgh et al. ............ | 261/77 |
| 6,360,730 | B1 * | 3/2002 | Koethe ........................ | 123/541 |
| 6,463,967 | B1 * | 10/2002 | Boyle ............................ | 141/94 |
| 6,547,188 | B2 * | 4/2003 | Schmutz et al. ......... | 244/135 R |
| 6,926,049 | B1 | 8/2005 | Enig | |
| 2003/0116679 | A1 * | 6/2003 | Susko ..................... | 244/135 R |

OTHER PUBLICATIONS

AFWAL-TR-85-2060 ("AFWAL") (the cover page and abstract are provided for applicant; the entire 200 page document is available on the web at http://stinet.dtic.mil/cgi-bin/GetTRDoc?AD=ADA167357&Location=U2&doc=GetTRDoc.pdf (the report is from 1986).*
Wikipedia, Inerting System, Dec. 30, 2004, Wikipedia, http://en.wikipedia.org/w/index.php?title=Inerting_system&oldid=16319068.*

* cited by examiner

*Primary Examiner*—Michael R Mansen
*Assistant Examiner*—Joshua J Michener

(57) ABSTRACT

A lightning protection system, method and aircraft are provided for reducing the flammability of jet fuel spilled during an in-flight refueling operation between a supplying aircraft and a receiving aircraft. An inert gas is injected adjacent to a refueling interface in order to displace oxygen in the fuel-air mixture and thereby reduce the ability of the fuel vapor to ignite upon occurrence of an ignition source such as lightning. The refueling system may comprise a boom or a hose and drogue type device.

6 Claims, 4 Drawing Sheets ized that the invention may have additional embodiments, or that the invention may be practiced without several of the details described below.

IN-FLIGHT REFUELING LIGHTNING PROTECTION SYSTEM

FIELD OF THE INVENTION

The present invention relates generally to in-flight refueling and associated systems and methods for providing a safe means for transferring fuel from one aircraft to another while flying in adverse weather conditions.

BACKGROUND OF THE INVENTION

In-flight refueling (or air-to-air refueling) is an operation where fuel is transferred from one aircraft to another aircraft during flight. The purpose of this operation is to extend the flight of an aircraft and thus increase its operational effectiveness. In most military cases, aircraft require many refueling events to extend the distance it can cover to complete its mission. Due to current safety requirements, an aircraft's flight distance may be unnecessarily extended to circumvent adverse weather where lightning may be encountered. Therefore, in-flight refueling is typically performed many miles from weather conditions where lightning may occur to minimize the potential for a lightning strike. As a result, more fuel is used to extend the aircraft's flight distance in order to avoid these weather conditions and, therefore, more refueling operations may be required. Thus, there is a need to protect an aircraft during in-flight refueling operation as a result of lightning strike.

Two methods of refueling aircraft in flight are typically practiced. One method is to use a rigid boom attached to the refueling aircraft with a connector and nozzle at its distal end to connect the refueling aircraft to the receiving aircraft. A second method is to use a flexible hose trailed behind the refueling aircraft that is attached to a drogue disposed at the end to connect the refueling aircraft to the receiving aircraft. In both methods, the fuel is transported from a tank in the refueling aircraft through a duct, across a connector and nozzle and then through a receiving duct in the receiving aircraft and finally into the receiving aircraft's fuel tanks. Typically, both systems incorporate a valve mechanism in the connector, close to the junction between the two aircraft such that if an emergency disconnect is performed, the valve will close and stop fuel flow to minimize loss of fuel into the surrounding air-stream. Jet fuel is flammable when the correct proportions of fuel vapor and oxygen are present. The oxygen content required to ignite and sustain combustion of fuel may change with air pressure or temperature changes; however, it is well known that jet fuel will only ignite when the proper fuel oxygen ratio is present in the fuel-air mixture.

Therefore, there exists a need for a device to reduce the risk during an in-flight refueling operation in the event of a lightning strike.

SUMMARY OF THE INVENTION

Aspects of the invention are directed generally to fuel shielding nozzles for refueling aircraft and associated systems and methods. An airborne refueling system in accordance with one embodiment of the present invention includes a fuel delivery device having a deployable portion configured to be deployed from an aircraft during in-flight refueling. The deployable portion may include at least a portion of a fuel line, an inert gas line and a conductor with a connector for temporary attachment to a receiving aircraft.

In further embodiments, the system may further include an aircraft, with the fuel delivery device being carried by the aircraft and an inert gas injecting system being located with the fuel delivery device. The injecting system may, in some embodiments, be a passive system where high pressure inert gas is passed from the refueling aircraft via a refueling device to at least one location on a surface of at least one of the conductor and connector. In further embodiments the injecting system may be an active system where inert gas is generated within the refueling aircraft and then actively transported from the refueling aircraft via a refueling device to at least one location on a surface of at least one of the conductor and connector.

In further embodiments the system may include a fire suppression system being carried by the refueling aircraft. The fire suppression system may be, in some embodiments, a high pressure storage system containing an inert gas that is non-reactive to fuel and that is distributed to the conductor via a duct in the fuel delivery device. In further embodiments, the fire suppression system may be a generation system where inert gas is controllably produced and distributed to the conductor via a duct in the fuel delivery device.

A method for refueling an aircraft in accordance with another aspect of the invention may include deploying from a refueling aircraft a portion of a refueling system that includes a fuel line, a fire suppression system, and a conductor with a connector. The method may further include injecting the inert fluid adjacent to the interface of the connector and the receiving aircraft.

In further embodiments the method may further include generating an inert fluid within the tanker aircraft and injecting the inert fluid adjacent to the interface of the connector and the receiving aircraft. Other aspects and features of the present invention, as defined solely by the claims, will become apparent to those of ordinary skill in the art upon review of the following non-limited detailed description of the invention in conjunction with the accompanying figures.

DETAILED DESCRIPTION OF THE INVENTION

The present invention is directed to a system, method, and aircraft for reducing the risk associated with the flammability of fuel spilled during an in-flight refueling operation. Specific details of various embodiments of the invention are set forth in the following description and in the Figures to provide a thorough understanding of the invention. Well known structures, systems and methods often associated with in-flight refueling have not been shown or described in detail to avoid unnecessarily obscuring the description of the various embodiments of the invention. One skilled in the art will understand that the invention may have other embodiments and this description should not be construed as limited to the embodiments set forth herein.

Figure 1A:
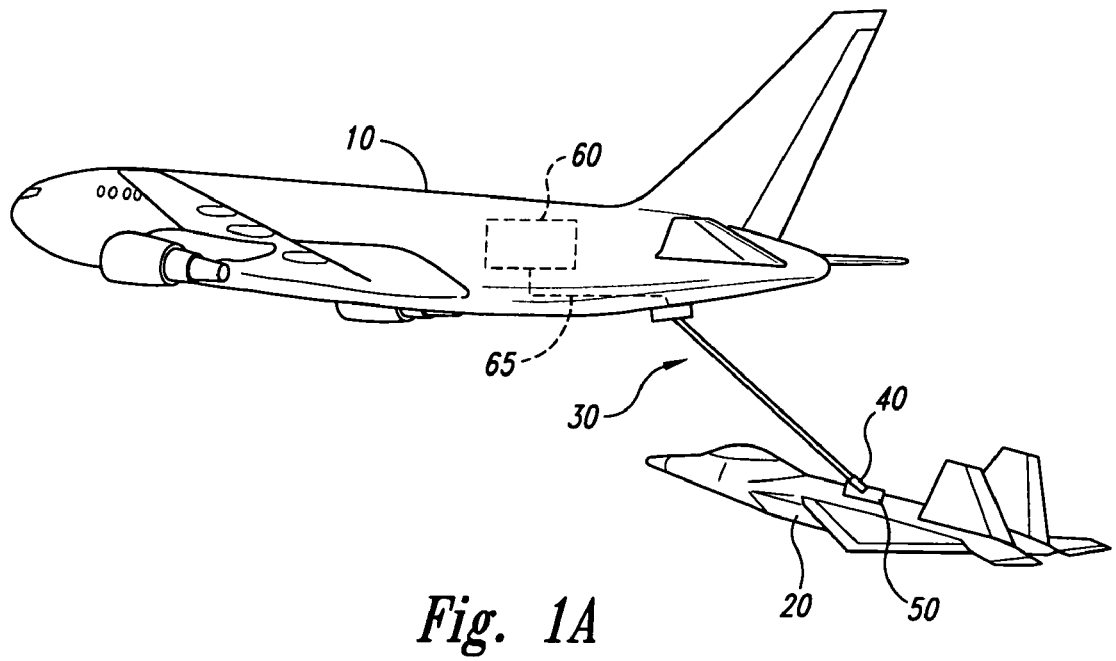
FIGS. 1a and 1b show a refueling aircraft refueling a receiver aircraft in accordance with preferred embodiments of the present invention.
Figure 1B:
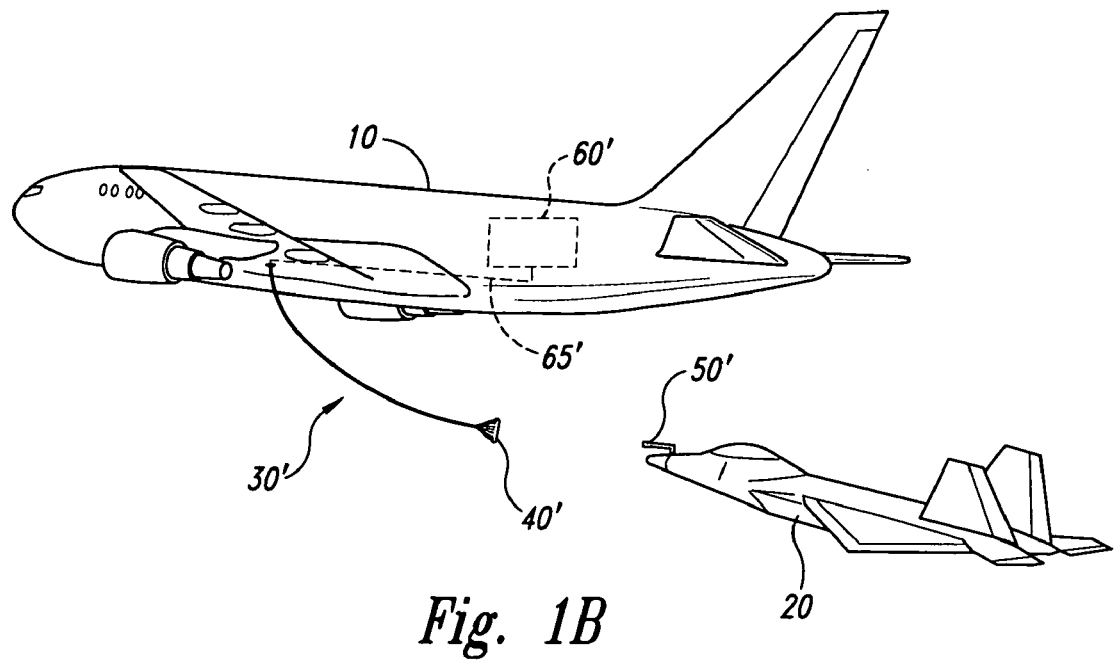

In preferred embodiments of the invention, FIGS. 1a and 1b generally depict a refueling aircraft 10 adapted to provide fuel to a receiving aircraft 20 during a typical in-flight refueling operation. During in-flight refueling, the refueling aircraft 10 holds a steady flight position while a receiving aircraft 20 maneuvers into a refueling position, typically behind and below the refueling aircraft. When in position the refueling aircraft will deploy a fuel delivering device 30,30' towards the receiving aircraft. Coupled to the distal end of the fuel delivering device 30,30' is a conductor 40,40' adapted to connect to a receiver 50,50' on the receiving aircraft 20. The receiving aircraft 20 may then temporarily couple the conductor 40,40' to the receiver 50,50'.

In a preferred embodiment of FIG. 1a, the fuel delivering device 30 consists of a rigid, telescoping boom attached to the refueling aircraft 10. The boom preferably contains a fuel duct to passably flow fuel and a duct to passably flow an inert gas. The fuel duct and the inert gas duct are coupled to a conductor 40 adapted to connect to a receiver 50 on the receiving aircraft 20.

In an alternative preferred embodiment of FIG. 1b, the fuel delivering device 30' consists of a flexible hose depending from the refueling aircraft 10. The hose preferably contains a fuel duct to passably flow fuel and an inert gas duct to passably flow an inert gas. The fuel duct and the inert gas duct are also coupled to a conductor 40' that is adapted to couple to a receiver 50' on the receiving aircraft 20.

Generally, fuel is transferred from fuel tanks within the refueling aircraft through the refueling device 30 and into the receiving aircraft 20. During the fuel transfer, an inert fluid is passed from an inert gas system 60 in the refueling aircraft 10, through the fuel delivering device 30 and is injected from the conductor 40 into the external airstream adjacent to the conductor 40 and receiver 50. Alternatively, the inert fluid may be injected into the internal fuel stream being transferred from the refueling aircraft 10 to the receiving aircraft 20. Preferably, the refueling device 30,30' provides both the fuel and the inert gas ducts or lines within a common housing such as a flexible hose or rigid tube, although in alternative embodiments the lines may be provided in separate housings.

In a further aspect of the present embodiment the inert gas system 60 may be a high pressure storage vessel containing an inert gas such as nitrogen. The system may contain a means 65, such as one or more valves, for controlling the flow of the inert gas from the storage vessel to the conductor 40. In another embodiment the inert gas system 60' may be an inert gas generating device, such as a Air Products membrane separator to separate nitrogen from ambient air for example, that can be controllably operated to generate an inert gas. These systems are in use in many commercial and military aircraft. The system may further include valves or other means 65' for controlling the flow of the inert gas from the on-board inert gas generating device to the conductor 40.

Figure 2A:
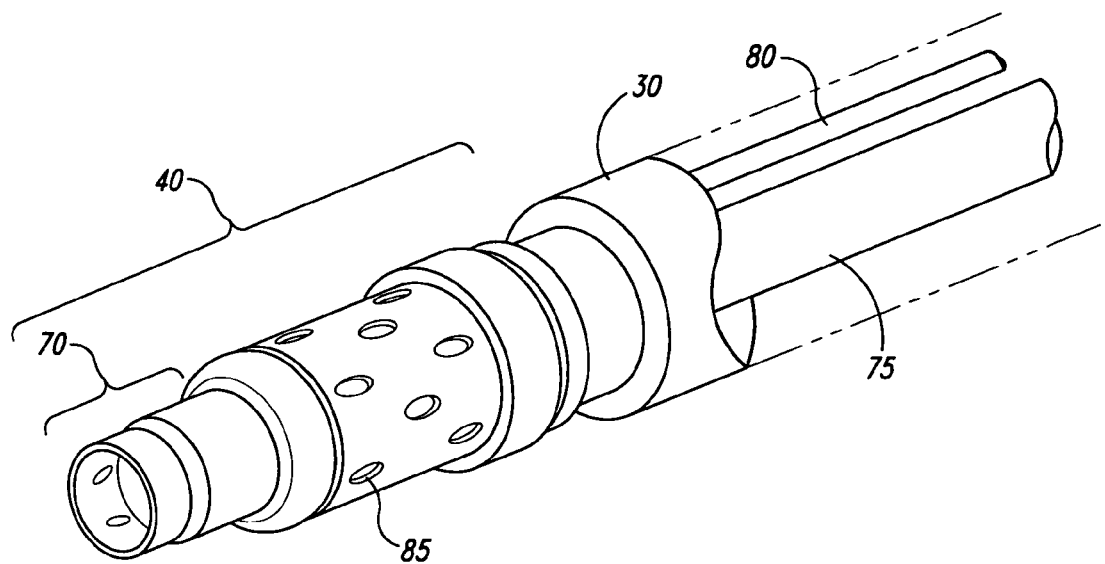
FIG. 2a shows a perspective view of a boom type conductor in accordance with a first preferred embodiment of the invention.
Figure 2B:
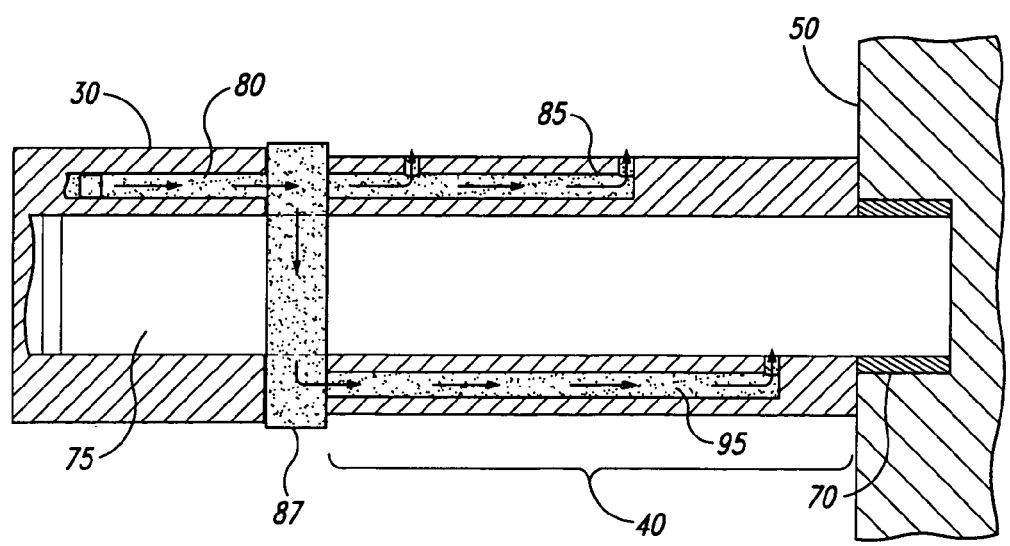
FIG. 2b shows a cross-sectional schematic view of a boom type conductor in accordance with another embodiment of the invention.

FIGS. 2a and 2b generally illustrate preferred embodiments of a device for injecting a fluid adjacent to a conductor 40 and a connector 70 that are attached to a boom-type of fuel delivering device 30. The fuel delivering device 30 may include a fuel duct 75 for passing a fluid such as jet fuel and a second duct 80 for passing an inert gas, as represented by the arrows in FIG. 2b. The conductor may also contain a plenum 87 for distributing inert gas from the second duct 80 to injecting ducts 85, 95. The conductor 40 may include a number of ducts 85 that connect the internal inert gas duct to an outer surface of the conductor 40 and are adapted to inject inert gas into the adjacent air stream. The conductor may also include a number of ducts 95 that connect the fuel duct 75 to an inner surface of the conductor 40 and are adapted to inject inert gas directly into the fuel duct.

Figure 3:
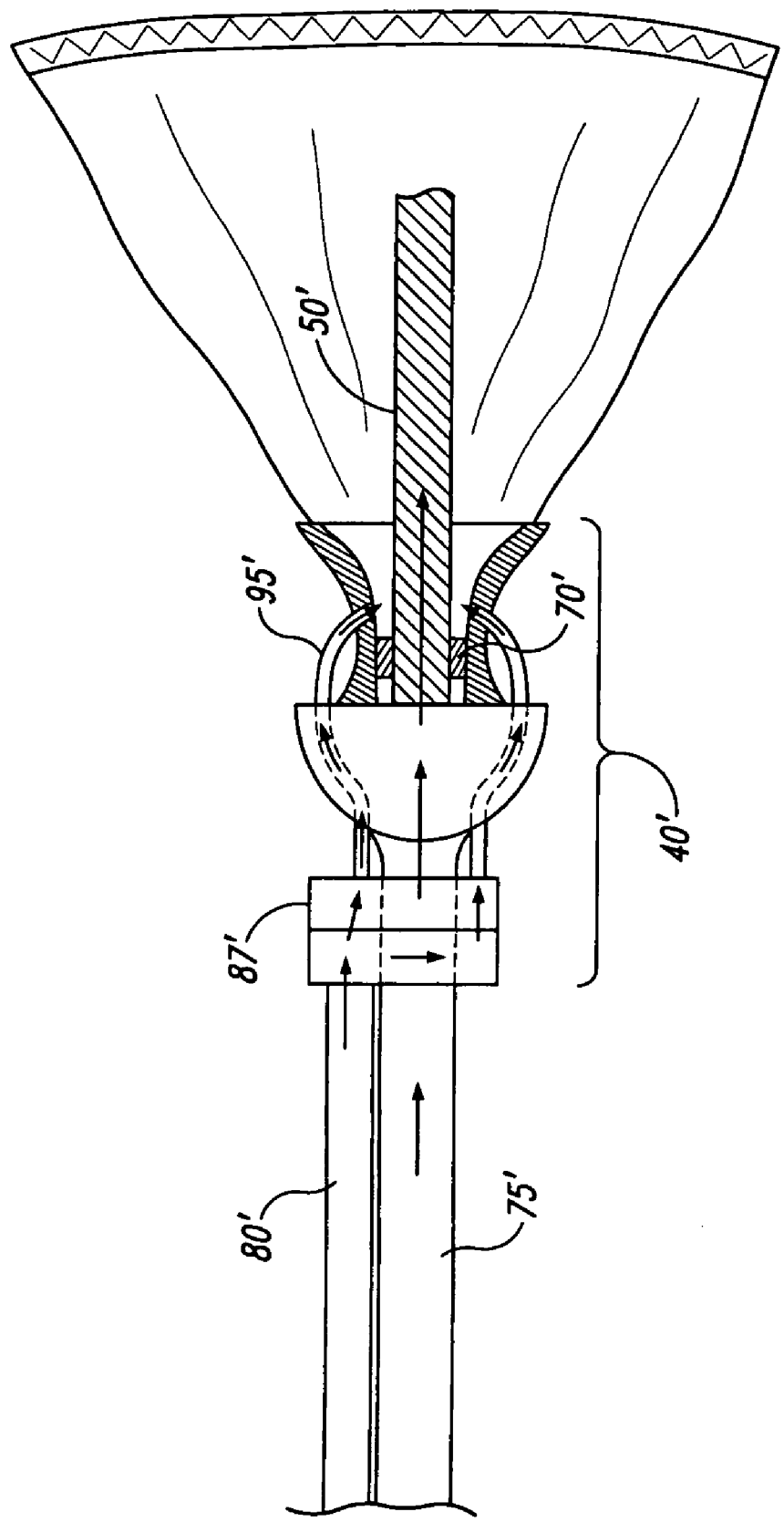
FIG. 3 shows a cross-sectional schematic view of a hose and drogue type conductor in accordance with a second preferred embodiment of the invention.

FIG. 3 generally illustrates a preferred embodiment of a device for injecting a fluid adjacent to a conductor 40' and a connector 70' that are attached to a hose and drogue type of fuel delivering device 30'. The fuel delivering device 30' may include a fuel duct 75' for passing a fluid such as jet fuel and a second duct 80' for passing an inert gas (represented by the arrows in FIG. 3). The conductor may also contain a plenum 87' for connecting the second duct 80' to a number of injecting ducts 95' and distributing an inert gas to the injecting ducts adapted to inject inert gas into the fuel duct of the conductor 40'.

Figure 4:
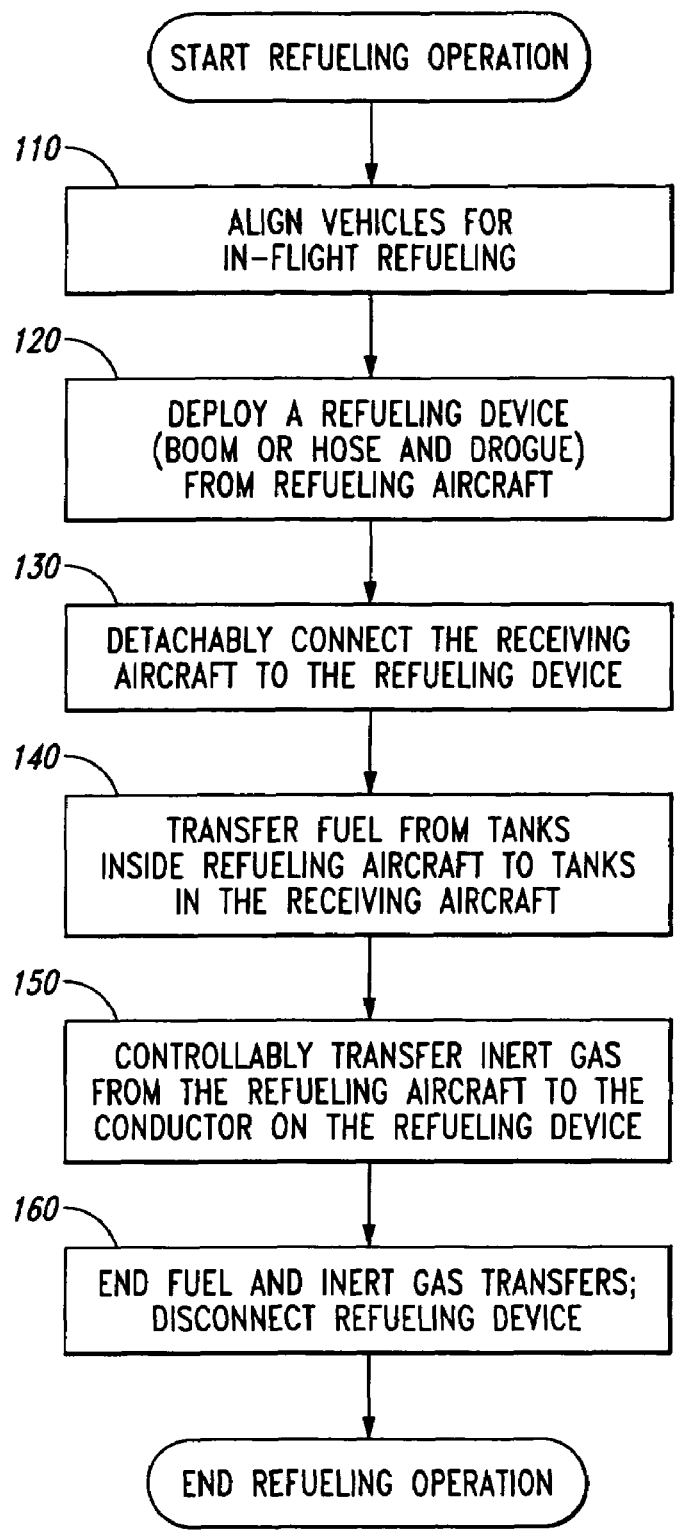
FIG. 4 shows a flowchart for a preferred method for shielding fuel from ignition during a refueling operation.

In another embodiment of the present invention, FIG. 4 is a block diagram illustrating a preferred method for a fire suppression system for reducing the risk during an in-flight refueling operation. The method may include aligning a refueling aircraft and a second aircraft to be refueled 110 in close proximity so a physical connection can be established. The method further includes deploying a device adapted to flow at least one fluid from the refueling aircraft to a conductor located on the distal end of the refueling device 120, the deployment occurring prior to or at about the same time as the aircraft alignment. The conductor can then be detachably coupled to a receiving location on the second aircraft 130. Fuel is transferred from the refueling aircraft to the second aircraft through the refueling device 140. Concurrently, during at least a portion of the refueling time, an inert gas is transferred from the refueling aircraft to the conductor 150 where it Is then injected from the conductor into at least one of the adjacent, external airstream and into the internal fuel duct to reduce the fuel-oxygen ratio and thus reduce the flammability of the fuel. Upon completion of the refueling operation, fuel and Inert gas transfer is stopped, and the refueling device is decoupled from the receiving aircraft 160. The receiving aircraft is safely maneuvered away from the refueling aircraft and may resume its normal flight operations.

A lightning protection system, method and aircraft for reducing the risk during an in-flight refueling operation have been disclosed. The scope of the invention is not limited by the specific embodiments disclosed herein, and one skilled in the art will understand there are other modifications and embodiments of the invention not described, but are in the scope of the claims that follow.

What is claimed is:

1. An airborne refueling system on a refueling aircraft, comprising:
   a refueling device configured to transport at least two fluids;
   a deployable duct coupled to the refueling device;
   a deployable conductor coupled to the end of the deployable duct, the conductor having a connector configured for temporary coupling to receiver located on a second aircraft, the conductor further having a fuel duct and a second duct wherein the fuel duct is in fluid communication with the refueling device and extends through the conductor and terminates at an end of the connector wherein the second duct terminates at positions on the fuel duct at injecting ducts, corresponding to a plurality of orifices, the orifices configured to inject an inert gas into the fuel duct; and
   wherein the plurality of orifices are positioned on a surface of the deployable conductor and adjacent to the connector.

2. The airborne refueling system of claim 1, wherein the second duct is coupled to and is in fluid communication with an inert gas system located in the refueling aircraft and extends within the conductor and terminates at one of said plurality of orifices positioned on the conductor.

3. An airborne refueling system on a refueling aircraft, comprising;
- a refueling device configured to transport at least two fluids; and
- a deployable conductor having a cylindrical structure defining a fuel duct extending the length of the conductor having a first end and a second end, and a wall having at least one inert gas duct extending longitudinally and substantially parallel to the fuel duct and terminating at injecting ducts, corresponding to a plurality of orifices located on a surface of the fuel duct; and configured to inject an inert gas into the fuel duct.

4. The airborne refueling system of claim 3 further comprising a plurality of ducts each having a first end located on a plenum, the plenum configured to distribute inert gas from an inert gas storage system to the at least one inert gas duct to the injecting ducts connected to the fuel duct and adapted to inject inert gas directly into the fuel duct.

5. The airborne refueling system of claim 3 further comprising a plenum that is located within the conductor and defines a volume around the perimeter of the fuel duct.

6. The airborne refueling system of claim 3 further comprising a duct extending from an inert gas system to a plenum located within the conductor.

* * * * *